United States Patent [19]
Deuel

[11] 3,977,620
[45] Aug. 31, 1976

[54] REVERSIBLE DRIVE FOR FLEXIBLE WEB

[75] Inventor: Ronald F. Deuel, Utica, N.Y.

[73] Assignee: Mohawk Data Sciences Corporation, Herkimer, N.Y.

[22] Filed: Sept. 29, 1975

[21] Appl. No.: 617,472

[52] U.S. Cl. ............................................... 242/67.4
[51] Int. Cl.² .............................................. B65H 17/02
[58] Field of Search ........... 242/67.4, 201; 197/160; 74/352, 404

[56] References Cited
UNITED STATES PATENTS

| | | | |
|---|---|---|---|
| 1,845,550 | 2/1932 | Metze | 242/67.4 |
| 3,627,219 | 12/1971 | Hanson | 242/67.4 |
| 3,670,981 | 6/1972 | Cavella | 242/67.4 |
| 3,923,267 | 12/1975 | Eckerd | 242/67.4 |

*Primary Examiner*—Edward J. McCarthy
*Attorney, Agent, or Firm*—Robert R. Hubbard

[57] ABSTRACT

A reversible drive apparatus for a flexible web, especially adapted to a reversible ribbon drive for a printing machine. A driving spur gear is arranged to be shifted between a pair of spur gears, each associated with a ribbon spool. The shifting is accomplished by mere reversal of direction of a drive motor which has a lead screw type shaft upon which the driving spur gear is mounted with mating screw threads. This allows the driving spur gear to travel laterally along the lead screw shaft between the pair of spur gears whenever the motor reverses direction.

3 Claims, 2 Drawing Figures

REVERSIBLE DRIVE FOR FLEXIBLE WEB

BACKGROUND OF INVENTION

1. Field of Invention

This invention relates to novel and improved reversible drive apparatus for a flexible web such as an inking ribbon in a printing machine. The reversible drive apparatus is characterized by its simplicity, low cost and ease of manufacture.

In printing machines using inking ribbons, it is conventional to provide a ribbon drive device to advance the ribbon after the printing of one or more characters. Advancement of the ribbon greatly enhances the clarity of the printed characters. In general, the ribbon is drawn from a supply spool to a take-up spool until the supply spool is fully unwound. Then the direction of ribbon feed is reversed whereby the original take-up spool now becomes the supply spool and the original supply spool becomes the take-up spool. This periodic reversal of the direction of ribbon feed greatly increases the useful like of the ribbon.

2. Prior Art

There have been many prior art attempts to achieve ribbon motion reversal by shifting a driving gear (driven by a single motor or driving force) between individual gear trains associated with the two ribbon spools. Typical prior art reversing mechanisms of this type are disclosed in U.S. Patent Nos. 1,309,423 and 3,670,981. These prior art ribbon reversing mechanisms generally use mechanical linkages which are rather complex, costly and unreliable. As a result, many printing machines have been designed to use two motors, one for each spool, and a motor control circuit which alternately drives the motors.

BRIEF SUMMARY OF THE INVENTION

A reversible drive mechanism for a flexible web includes first and second spools which are adapted to receive first and second ends of the web. First and second gears are coupled to the first and second spools so as to rotate the spools in opposite directions. A third gear is arranged to be shifted from engagement with one of the first two gears into engagement with the other in order to reverse the motion of the web. The mechanism is further characterized in that all of the gears are mounted between first and second stops with parallel axes of rotation. A drive motor is coupled to bidirectionally rotate a shaft upon which the third gear is mounted. The shaft and the third gear have mating worm or screw threads such that when the motor rotates the shaft in one direction, the third gear is against the first stop in engagement with and rotating the first gear in a first direction in which the first spool takes up the web. When the motor reverses to rotate the shaft in the other direction, the third gear shifts longitudinally along the shaft until it reaches the second stop where it engages the second gear and rotates it in a second direction in which the second spool takes up the web.

BRIEF DESCRIPTION OF THE DRAWING

In the accompanying drawing like reference numbers denote like elements of structure, and.

DESCRIPTION OF PREFERRED EMBODIMENT

Figure 1:
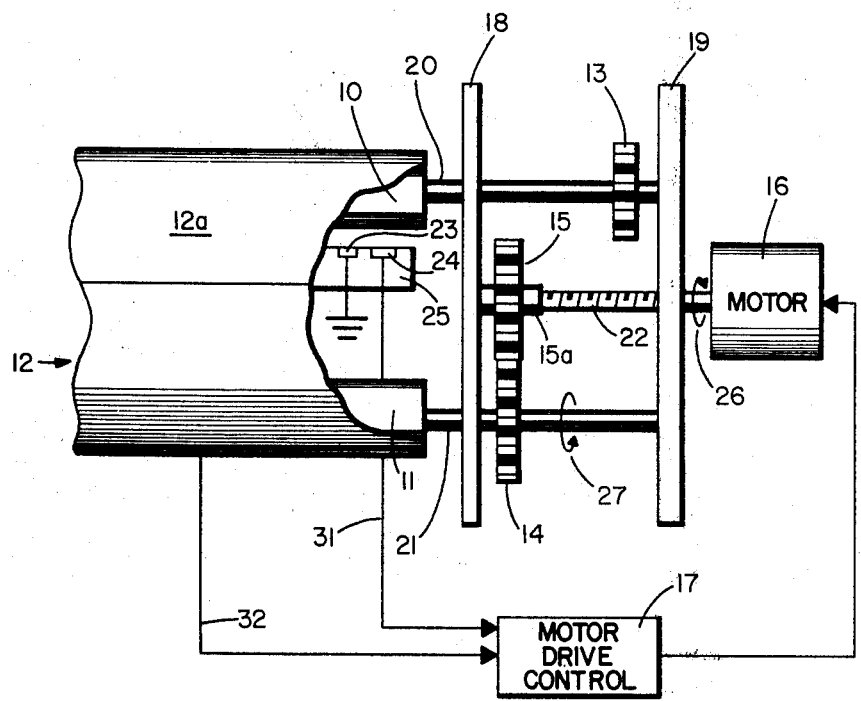
FIG. 1 is an elevational view, in part, and a block diagram, in part, of reversible web drive apparatus embodying the present invention.

With reference now to FIG. 1 of the drawing, flexible web reversible drive apparatus embodying the invention is shown by way of example in a printing machine which includes a pair of spools 10 and 11, a pair of associated spur gears 13 and 14, a drive gear 15, a motor 16 and a motor drive control 17. The spool 10 and its associated spur gear 13 are mounted upon a common shaft 20. Similarly, the spool 11 and its associated spur gear 14 are mounted upon another common shaft 21. The shafts 20 and 21 are secured to bearing surfaces (not shown) in stop members 18 and 19 in such a manner as to allow low friction rotation of the shafts. The stop members 18 and 19 may suitably be formed as a part of the printing machine frame.

The spur gear 15 is mounted upon a shaft 22 which, in the illustrated design, is also the armature shaft of the motor 16. The spur gear 15 includes a central hub member 15A. The hub member 15A and the shaft 22 have mating worm or screw threads. The shaft 22 is mounted or secured to stop element 18 by means of a low friction bearing (not shown) so as to allow low friction rotation of the shaft. Either the shaft 22 or the motor 16 may be mounted to the stop element 19 in order to provide further stability of the shaft 22 relative to the shafts 20 and 21 in such a manner as to allow the low friction rotation thereof.

Spools 10 and 11 are each adapted to receive opposing ends of a web or ribbon 12 (by any suitable fastening means not shown). Although it is contemplated that any suitable means may be employed to detect the condition where the supply spool is really empty and the take-up spool is nearly full of ribbon, the illustrated embodiment employs as an end of web detector a pair of short circuit detectors suitably placed relative to the two spools 10 and 11 so as to coact with metallic foil portions which are located at either end of the ribbon 12. This type of arrangement is well known and is used, for example, in the Model 5321 printer, which is a product of Mohawk Data Sciences Corp. For the sake of convenience, one of the short circuit detectors is illustrated to include a pair of shorting bars 23 and 24 arranged on a ribbon guide element 25 to coact with the metallic foil portion 12a to detect the empty condition of the spool 10. The shorting bar 23 is connected to circuit ground and the bar 24 is coupled via a lead 31 to the motor drive control 17. Another lead 32 couples the non-illustrated short circuit detector to motor drive control 17. Accordingly, when either of the short circuit detectors senses the presence of the associated metallic foil portion, a circuit is completed to the motor drive control 17. This causes the motor drive control 17 to cause a reversal of the motor 16.

In operation then, the motor drive control 17 drives motor 16 to cause it to rotate the shaft 22 in either one direction or the other. When the shaft 22 is rotating in the direction indicated by arrow 26, the spur gear 15 is at the extreme left of the shaft 22 in alignment and engagement with the spur gear 14 so as to rotate the shaft 21 and associated spool 11 in the direction indicated by arrow 27. For this sense of shaft rotation, the spool 11 acts as a take-up spool and the spool 10 acts as a supply spool. When the supply spool 10 is nearly empty, the metallic foil portion 12a engages the metallic bars 23 and 24 which in turn causes the motor drive control 17 to cause the motor 16 to reverse the direction of rotation of shaft 22. When this happens, spur gear 15 travels longitudinally along the shaft 22 in a lead screw type operation toward stop element 19. When the spur gear hub 15a engages the stop 19, the spur gear 15 is in alignment with and in engagement with spur gear 13. When this happens both of the gears now rotate in such a direction that the spool 10 acts to take up ribbon from the spool 11. When the spool 11 is nearly empty, the non-illustrated metallic foil portion makes contact with the non-illustrated short circuit detector to provide a connection to circuit ground via lead 32 to the motor drive control 17 so as to cause the motor to again reverse its direction.

In the operation as described above, it should be noted that the supply spool (the one which is not being driven by spur gear 15) is free to rotate due to its low friction bearing mounting in the stop elements 18 and 19. The axial length of the spur gear hub 15a is greater than the axial length of the spur gear 15 so that the gear 15 can be in alignment with gears 13 and 14 when the hub of 15a is positioned against the stop elements 18 and 19, respectively.

The motor 16 may be any AC or DC motor having specifications which meet a particular design requirement. In one design embodying the invention the motor 16 takes the form of a shaded pole motor having field winding a clockwise (cw) shading winding and a counterclockwise (ccw) shading winding (neither of which is shown). The shading windings are selectively driven by the motor drive control 17. For this embodiment, the motor drive control 17 may take the form of the circuit shown in FIG. 2.

Figure 2:
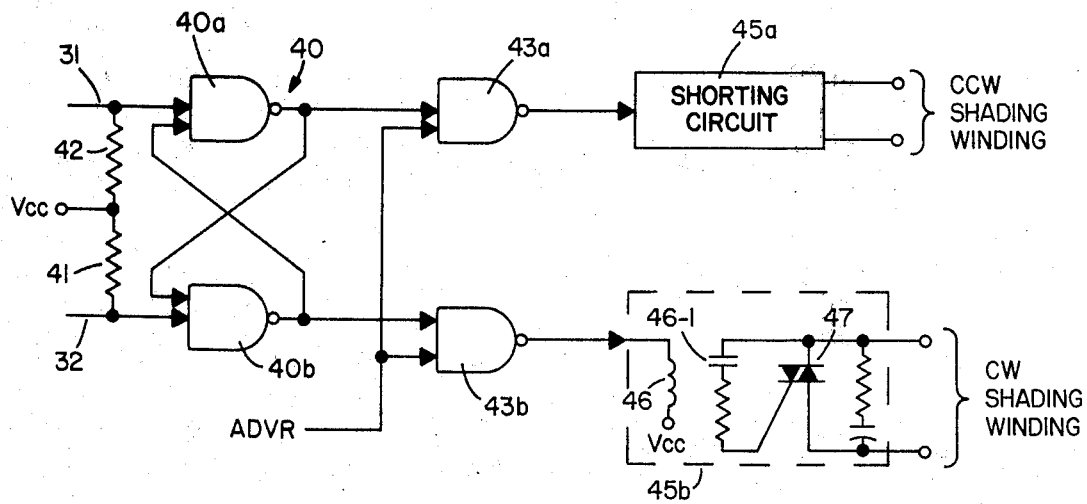
FIG. 2 is an exemplary motor drive control network which can be employed in the FIG. 1 reversible web drive apparatus.

As shown in FIG. 2 the leads 31 and 32 from the short circuit detectors are coupled to the input of a data latch or flipflop 40. The flipflop 40 is shown to include a pair of cross-coupled NAND gates 40a and 40b. Thus, lead 31 is coupled to one input of gate 40a and lead 32 is coupled to one input of gate 40b. Leads 31 and 32 are coupled by way of separate resistors 41 and 42 to a source of positive voltage designated as Vcc. The Vcc source and resistors act as a source of 1's, circuit ground acting as the 0 value for purpose of discussion herein.

The latch 40 acts to sense binary 0's on the leads 31 and 32 corresponding to the short circuit detectors sensing the end foil portions of the ribbon 12. The outputs of gates 40a and 40b essentially control the ccw and cw shading windings of the motor 16 through separate, but identical, circuit branches, to thereby control the direction of rotation of motor 16. Thus, gate 40a has its output coupled via NAND gate 43a and a shorting circuit 45a to the ccw shading winding of a motor 16. On the other hand, gate 40b has its output coupled via NAND gate 43b and shorting circuit 45b to the cw shading winding of the motor 16. The NAND gates 43a and 43b are enabled by a 1 value of an advance ribbon (ADVR) signal. The gates 43a and 43b act to sense a 1 at the outputs of gates 40a and 40b respectively. The ADVR signal is supplied by the printing machine electronics and generally is a 1 when the printing machine is in a printing mode and is a 0 at all other times.

In operation let us assume that the motor 16 is rotating in a cw direction as illustrated in FIG. 1 so that the spool 11 is rotating in a ccw direction to act as the take-up spool while spool 10 is the supply spool. For this condition (and assuming that the end foil portion 12a has not yet contacted the shorting bars 23 and 24) the outputs of gates 40a and 40b are 0 and 1, respectively. The ADVR signal is a 1 (assuming a printing mode) so that the output of the gates 43a and 43b are 1 and 0, respectively. Shorting circuit 45b responds to the 0 output of gate 43b to short circuit the cw shading winding of the motor 16. On the other hand, a shorting circuit 45a responds binary 1 output of gate 43a to place an open circuit across the ccw shading winding of the motor. For this condition, the motor 16 rotates in a cw direction.

When end foil portion 12a comes into contact with the shorting bars 23 and 24, a binary 0 signal is applied to gate 40a. This causes the flipflop 40 to change condition such that the outputs of gates 40a and 40b become 1 and 0, respectively. This in turn causes the outputs of gates 43a and 43b to become 0 and 1, respectively. The 0 output of gate 43a causes shorting circuit 45a to place a short circuit across the ccw shading winding. On the other hand, the 1 output of gate 43b causes shorting circuit 45b to place an open circuit across the cw shading winding. For these conditions, the motor now rotates in a ccw direction such that spool 10 becomes the takeup spool and spool 11 becomes the supply spool.

When the spool 11 becomes empty, the other foil portion (not shown) is detected by the other short circuit detector to cause a binary 0 to be applied to lead 32. This will cause the flipflop 40 to toggle its state back to the original condition and result in the reversal of direction of the motor 16 so that it again rotates in a cw direction.

The shorting circuits 45a and 45b are substantially identical and may take on any suitable form. By way of example and completeness of description, shorting circuit 45b is shown to include a relay coil 46 which is energized only when the outputs of gates 40b and 43b are 1 and 0, respectively. When the relay coil 46 is energized, its associated relay contact 46-1 close and turn on a triac device 47. When the triac device 47 is turned on, it provides a substantially zero impedance path across the cw shading winding. When device 47 is turned off, it acts as an open impedance across the cw winding.

Although the spool 10 and 11 have been shown in rather simplistic form herein for the sake of convenience, it will be appreciated that such spools may assume any appropriate configuration dependent upon the application. Reference is made to U.S. Pat. 3,701,318 for a spool or ribbon mandrel which may suitably be employed in printing machine embodiments.

While a preferred embodiment of the invention has been shown in the drawings, it is to be understood that this disclosure is for the purpose of illustration only and that various changes in shape, proportion and arrangement of parts, as well as the substitution of equivalent elements for that herein shown and described, may be made without departing from the spirit and scope of the invention set forth in the appended claims.

What is claimed is:

1. A reversible drive mechanism for a flexible web in which first and second spools are adapted to receive first and second ends of the web, respectively, first and second gears are coupled to the first and second spools, respectively, so as to rotate said spool in opposite directions and a third gear is arranged to be shifted from engagement with one of the first and second gears into engagement with the other in order to reverse the motion of the web, characterized in that all the gears are mounted between first and second stops with parallel axes of rotation; that a drive motor is coupled to bidirectionally rotate a shaft upon which said third gear is mounted, said shaft and third gear having mating worm threads such that when the motor rotates the shaft in one direction, the third gear is against the first stop in engagement with and rotating the first gear in a first direction in which the first spool takes up the web and that when the motor reverses to rotate the shaft in the other direction, the third gear shifts longitudinally along the shaft until it reaches the second stop where it engages the second gear and rotates it in a second direction in which the second spool takes up the web.

2. A reversible web drive mechanism as set forth in claim 1 and further characterized in that an end of web detector signals a motor drive control means when either of the spools is nearly empty and that the motor drive control means responds to such signalling to reverse the motor.

3. Reversible web drive mechanism as set forth in claim 1 and further characterized in that the motor armature is directly coupled to said shaft.

* * * * *